United States Patent [19]
Pletcher

[11] 3,944,147
[45] Mar. 16, 1976

[54] BRUSH CHIPPER

[75] Inventor: Robert E. Pletcher, Azusa, Calif.

[73] Assignee: Asplundh Tree Expert Co., Willow Grove, Pa.

[22] Filed: Dec. 6, 1974

[21] Appl. No.: 530,272

[52] U.S. Cl.............. 241/60; 241/101.7; 241/189 R
[51] Int. Cl.² B02C 18/14; B02C 21/02; B02C 23/20
[58] Field of Search............. 241/55, 56, 60, 101.7, 241/189 R, 190, 292.1

[56] References Cited
UNITED STATES PATENTS

| | | | |
|---|---|---|---|
| 2,869,793 | 1/1959 | Montgomery | 241/60 X |
| 3,049,857 | 8/1962 | Shaw | 241/101.7 X |
| 3,861,602 | 1/1975 | Smith | 241/101.7 X |
| 3,881,662 | 5/1975 | Gunnarsson | 241/292.1 X |

Primary Examiner—Roy Lake
Assistant Examiner—E. F. Desmond
Attorney, Agent, or Firm—John W. Logan, Jr.

[57] ABSTRACT

The preferred embodiment of the invention disclosed herein includes a housing having an inlet opening and an outlet opening, the latter being in communication with a discharge chute. Inside the housing a cutter bar is rigidly mounted adjacent a rotor assembly including a plurality of cutting blades which cooperate with the cutter bar for cutting brush, that is, tree limbs and similar debris, into small chips. The brush is fed to the cutter bar through the inlet opening and the chips are discharged through the outlet opening into the discharge chute where they are carried away in a high velocity air stream provided by a blower unit. Further included is inertia means mounted for rotation with the rotor assembly whereby the rotor assembly can be rotated at lower speeds while assuring that the cutting blades exert sufficient force to adequately cut the brush. Finally, air vents are formed adjacent the rotor assembly between the outlet opening and the air stream to prevent the blower unit from creating a vacuum adjacent the rotor assembly.

10 Claims, 3 Drawing Figures

BRUSH CHIPPER

This invention relates to brush chippers that reduce the volume of tree branches and similar debris by cutting it into small chips and, more particularly, to brush chippers that are relatively quiet in operation.

As a result of various tree pruning, land clearing and similar operations, tree limbs and similar debris referred to as brush are provided and should be reduced in volume to facilitate its handling and disposal. At the present time, brush chippers are utilized to cut the brush into small chips which can be deposited in an easily handled pile and utilized for natural recycling as mulch or ground cover or which can be utilized for pulp in making paper. One type of brush chipper which has been effectively used includes a housing having an inlet opening and an outlet opening in communication with a discharge chute. Carried in the housing is a cutter bar and a rotor assembly including a plurality of cutting blades which cooperate with the cutter bar for cutting brush fed through the inlet opening into small chips and for discharging the chips through the outlet opening into the discharge chute. A blower is usually associated with the discharge chute for facilitating the conveyance of chips through the chute.

While brush chippers of the type described above cut brush in a generally satisfactory manner, their operation is relatively noisy and is, in fact, unsatisfactory by today's standards. A major source of operating noise while the chipper is not cutting brush is the rotor assembly which is conventionally formed with recesses in which the cutting blades are carried. The cutting blades do not occupy the full volume of the recesses so that a portion of each recess receives chips during the cutting operation and hurls the chips into the discharge chute. The unoccupied portion of the recesses carry air and when the rotor is rotating the air is compressed as the recesses approach the cutter bar and expands after the recesses pass the cutter bar. Since the rotors are driven at relatively high speeds the compression and expansion occurs rapidly and frequently thus developing a significant level of noise.

Accordingly, it is an object of this invention to provide a brush chipper that is relatively quiet in operation.

It is a further object of this invention to provide an arrangement for reducing the noise of brush chippers and which is suitable for use with existing brush chippers with only minor modification.

Finally, it is yet another object of this invention to provide a brush chipper that is relatively quiet in operation and that is simple and economical to construct and effective in operation.

These and other objects of this invention are accomplished by providing a brush chipper having a housing formed with an inlet opening and an outlet opening communicating with a discharge chute. Inside the housing, a cutter bar is rigidly carried adjacent a rotor assembly rotatably mounted therein and including a plurality of cutter blades constructed and arranged to cooperate with the cutter bar to cut brush fed through the inlet opening into small chips and to discharge the chips through the outlet opening into a discharge chute. Also included is a blower means communicating with the discharge chute at a point spaced from the outlet opening to provide a stream of air which conveys the chips through the discharge chute. Mounted for rotation with the rotor assembly is inertia means, preferably in the form of a flywheel, which allows the rotor assembly to be driven at a relatively slow speed and still provide sufficient force to adequately cut the brush chips. Adjacent the rotor assembly and preferably between the outlet opening and the point of communication between the blower means and the discharge chute, is formed an air inlet which prevents the blower from creating a vacuum adjacent the rotor. Because of the relatively slow speed of the rotor assembly and the presence of air adjacent the rotor assembly, the operating noise level of the brush chipper is reduced to an acceptable level.

More particularly, the inertia means is such that the speed of the cutter blades can be reduced to about 58% to 84% of their normal operating speed and, preferably, to about 65% of their normal operating speed. The normal speed of the cutting blades of conventional brush chippers is in the range of about 9,000 fpm to 9,500 fpm which can be reduced in accordance with this invention to about 5,500 fpm to about 7,500 fpm and preferably to about 6,000 fpm.

For a better understanding of the invention, reference is made to the following description of a preferred embodiment taken in conjunction with the figures of the accompanying drawing in which.

Figure 1:
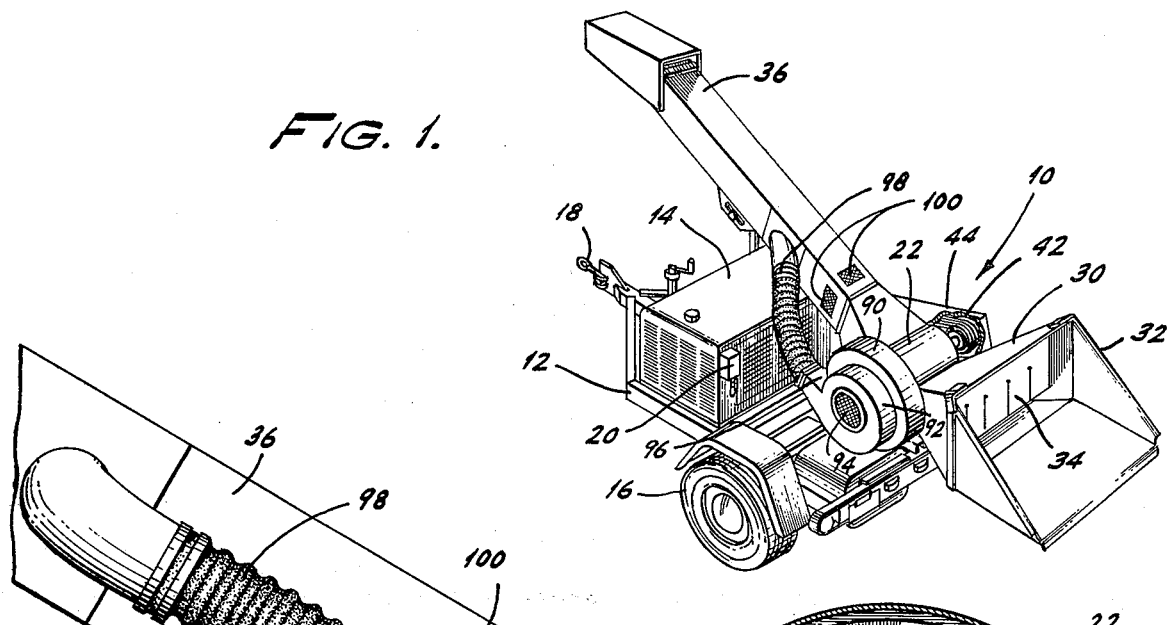
FIG. 1 is a perspective view of a trailer on which is carried a power supply and a brush chipper in accordance with this invention.

Referring briefly to FIG. 1 of the drawing, there is illustrated a preferred embodiment of a brush chipper 10 in accordance with this invention which is mounted on trailer 12 on which is also mounted a power supply 14 for driving the brush chipper. As is generally conventional, trailer 12 includes wheels 16, only one of which can be seen, and a draw bar 18 so that it may be hitched to the back of a truck and transported with brush chipper 10 and power supply 14 from one job site to another. In the embodiment disclosed herein and as is also conventional, power supply 14 is in the form of a gasoline engine and includes a throttle 20 for controlling the output speed of the engine and, accordingly, brush chipper 10.

Figure 3:
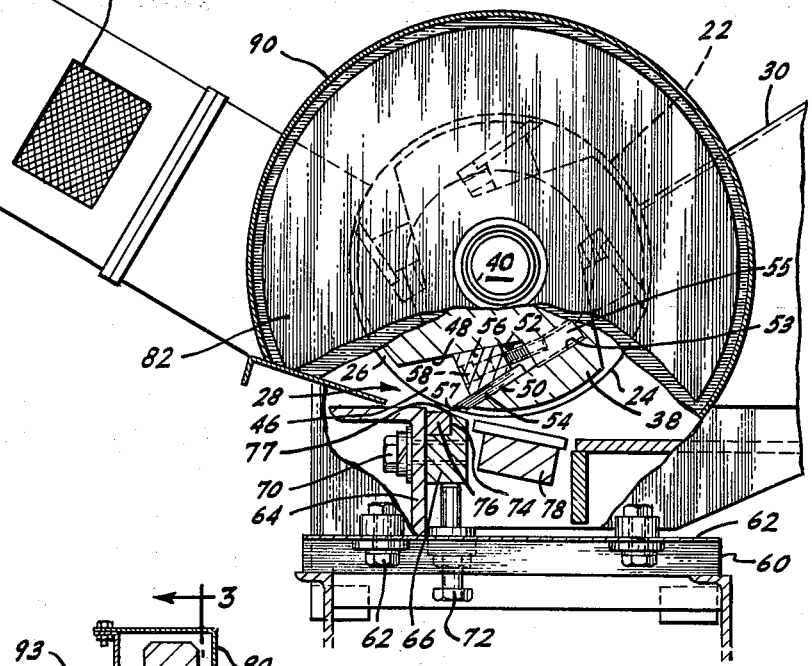

As can best be seen in FIG. 3 of the drawing, brush chipper 10 includes an enclosed generally cylindrical housing 22 formed with an inlet opening 24 and an outlet opening 26. Located within housing 22 intermediate inlet and outlet openings 24 and 26, respectively, is a brush cutting assembly 28 which will be explained in further detail hereinafter. At this point, however, it is noted that brush cutting assembly 28 is operative to cut brush fed through inlet opening 24 into small chips and discharge the chips through the outlet opening 26. Communicating with inlet opening 24 is a feed chute 30 and a feed table 32 on which brush may be rested while being fed to brush cutting assembly 28 through feed chute 30 and inlet opening 24. Feeding of brush to cutting assembly 28 is generally a manual operation and, thus, located over the opening of feed chute 30 is a flexible shroud 34 which protects the operator during the feeding operation. Extending upwardly and away from outlet opening 28 is a discharge chute 36 formed with a discharge opening (not shown) for conveying the chips from brush chipper 10 to an appropriate storage device. If, as is usual, brush chipper 10 is mounted on a trailer hitched to a truck, the storage device is the enclosed bed of the truck.

Figure 2:
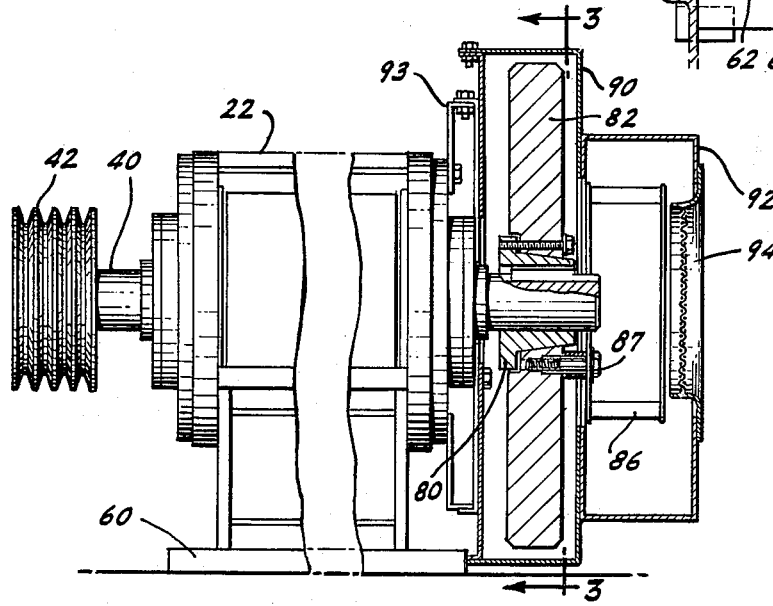
FIG. 2 is a side elevational view with parts in section of the brush chipper illustrated in FIG. 1; and, FIG. 3 is a sectional view taken along line 3—3 of FIG. 2 with parts thereof broken away for the sake of clarity.

Still referring to FIG. 3, brush cutting assembly 28 is clearly illustrated. Included is a generally cylindrical rotor 38 carried on a shaft 40 centrally located within cylindrical housing 22 and extending through the end walls thereof. One end of shaft 40 fixedly carries a sheave 42 which cooperates with a drive belt 44 driven by the output shaft of the power supply 14 for driving rotor 38. As best seen in FIG. 2, sheave 42 is formed with a plurality of grooves such that a plurality of belts are utilized to drive rotor 38. Referring back to FIG. 3, it can be seen that rotor 38 is formed with a plurality of recesses 46 extending generally inwardly from the periphery of the rotor. Each recess 46 includes first and second sidewalls 48 and 50 and a backwall 52 all of which form an angle with the radius of the cross-section of rotor 38. A threaded opening 53 communicates with backwall 52 of recess 46 and with sidewall 48 of the adjacent recess 46. Threaded opening 53 receives an adjusting screw 55 on which bears the end face of a cutting blade 54 a side face of which bears along sidewall 50 of recess 46. Cutting blade 54 is formed with a cutting edge 57 usable to cut brush as will be explained hereinafter and is seated in recess 46 so that the cutting edge projects beyond the outer surface of rotor 38. By adjusting the position of screw 55 in threaded opening 53, the projection of cutting edge 57 relative to rotor 38 can also be adjusted. Securing cutting blade 54 in recess 46 is a wedge bar 56 having a shape generally complimentary to that of recess 46, but being smaller than the recess as clearly illustrated in FIG. 3 of the drawing. Wedge bar 56 is formed with a central opening in which is received a locking screw 58 for securing wedge bar 56 to rotor 38. After locking screw 58 has been tightened, wedge bar 56 clamps cutting blade 54 in position against sidewall 50 and adjusting screw 55.

Still referring to FIG. 3, it can be seen that housing 22 is secured to a base member 60 by a plurality of fasteners 62 and that the base member is carried on the frame of trailer 12 or may be an integral part thereof. Extending upwardly from base portion 60 is an angle iron 64 which carries a pressure bar 66. Conveniently, pressure bar 66 can include a threaded opening aligned with an opening in angle iron 64 for receiving a fastener 70 which secures the pressure bar to the angle iron. Additionally, another fastener 72 can extend through the bottom of base member 60 into supporting engagement with the bottom face of pressure bar 66. On the upper surface of pressure bar 66 is formed a notch 74 which defines with angle iron 64 a seat in which is carried a cutter bar 76 having a generally square cross-section and formed with cutting edges 77 at the intersection of the wall surfaces. The height of the walls are larger than the depth of notch 74 so that a cutting edge 77 projects above the top face of pressure bar 66. Angle iron 64 and pressure bar 66 are located such that a cutting edge 77 of cutter bar 76 is located adjacent the periphery of rotor 38 and spaced by a small distance from cutting edge 57 on cutting blade 54. Between inlet opening 24 and cutter bar 76 is a floor plate 78 inclined at a slight angle to base member 60 so that it guides brush to be cut to the cutting assembly 28. Thus, when rotor 38 is driven in the direction of the arrow in FIG. 3 of the drawing cutting blades 54 cooperate with cutter bar 76 to cut brush into small chips and the chips are thrown into a pocket formed by the unoccupied volume of recesses 46, that is the volume defined by the end face of wedge bar 56 and the sidewalls 48 and 50 of recess 46. Further rotation of rotor 38 causes the chips to be hurled through outlet opening 26 into discharge chute 36.

As noted previously, shaft 40 extends through the end walls of housing 22 and on the projecting end opposite sheave 42 is keyed to a hub 80, to which is secured an inertia means, conveniently a flywheel 82 which is secured to the hub by fasteners 85. The purpose of flywheel 82 will be explained hereinafter it being sufficient to note at this point that flywheel 82 rotates with rotor 38. An impeller 86 is secured to the outer face of flywheel 82 by a suitable fastener and spacer assembly 87 so that the impeller rotates with the flywheel. A shroud 90 covering flywheel 82 and including a reduced diameter portion 92 covering impeller 86 is secured to a plate 93 carried on housing 22. The outer wall of shroud portion 92 is formed with an opening 94 which is centrally located about the axis of shaft 40 and impeller 86. As best seen in FIG. 1, shroud portion 92 is also formed with a tangential discharge conduit 96 which communicates with a flexible conduit 98. The other end of conduit 98 communicates with the interior of discharge chute 36 at a point spaced from outlet opening 26 and rotor 38. From the above description it should be clear that impeller 86 functions as a blower drawing air through intake opening 94 and discharging a stream of air at high velocity through discharge conduit 96 and flexible conduit 98 to the interior of discharge chute 36. This stream of air picks up the chips discharged into discharge chute 36 and carries the chips upwardly along the chute through the discharge opening of the chute.

Completing the description of a preferred embodiment of the invention, discharge chute 36 is formed with air inlet means in the form of vents 100 located as close to rotor 38 as possible. For safety purposes, vents 100 are covered with a screen as shown in the drawing. Preferably one vent is formed on the top and side faces of discharge chute 36, but such an arrangement is not necessary as will be understood from the explanation of the air vent function.

As will now be explained because of flywheel 82 and air vents 100, the noise produced by brush chipper 10 during its operation is significantly reduced relative to conventional brush chippers and, in fact, is acceptable by present standards. When brush chipper 10 is operative and rotor 38 is rotating air is carried in the unoccupied portion of each recess 46, that is, that portion defined by sidewall 48, the end face of wedge bar 56 and the top face of cutting blade 54. As any recess approaches cutter bar 76, the air is compressed and after is passes the cutter bar, the air is expanded. In conventional brush chippers, the speed of the rotor is such that the speed of the cutting edge of the blades is relatively high, normally in the range of 9,000 fpm to 9,500 fpm, to assure adequate cutting of the brush. Therefore, the compression and expansion of the air occurs rapidly and frequently and is, therefore, a significant source of noise. Adding to the noise is the fact that the blowers used to discharge the chips create a vacuum adjacent the rotor so that the amplitude of the expansion is significant.

Use of flywheel 82 or other inertia means in accordance with this invention allows the speed of rotor 38 and, accordingly, recesses 46 to be reduced so that the frequency of the noted expansion-compression cycle is reduced while assuring that cutting blades 54 exert sufficient force on brush to adequately cut it into chips. In accordance with this invention it has been found that the speed of cutting blades 54 can be reduced to a range of about 58% to about 84% of the normal operating speed without the inertia means. Preferably, the operating speed is reduced to about 65% of the normal operating speed. For a typical brush chipper in accordance with this invention the speed of cutter blades 54 can be reduced from a range of about 9,000 fpm to 9,500 fpm to a range of about 5,500 fpm to 7,500 fpm and preferably to about 6,000 fpm. Within the noted range, cutter blades 54 exert sufficient force to adequately cut brush into chips and the noise has been reduced since the frequency of the compression-expansion cycle has been reduced.

Further, use of air vents 100 assures that during operation of brush chipper 10, the blower will not create a vacuum adjacent rotor 38. As the blower drives the air through discharge chute 36, air flows through vents 100 so that air is always present adjacent rotor 38. Because of the presence of air the amplitude of the compression-expansion cycle is reduced. It should be clear that any number of air vents 100 can be provided and that regardless of their number it is desirable to locate the air vents as close to rotor 38 as possible.

The combined effect of the inertia means and the air vents is to reduce the noise provided by the compression and expansion of the air in recesses 46 to an acceptable level, while assuring adequate chipping of brush. For example, a brush chipper without the inertia means and air vents was tested while the rotor was driven at about 3,000 rpm. At that rotor speed the speed of the cutting blades was about 9,400 fpm and provided adequate cutting of brush noise was measured at various distances from the following locations: the edge of the feed table, point A; the fender adjacent the blower, point B; the end of the discharge chute, point C; and, the fender adjacent the drive belt, point D. The results of that test are indicated in Table I with the noise given in db(A).

TABLE I

| DISTANCE (FEET) | POINT A | POINT B | POINT C | POINT D |
|---|---|---|---|---|
| 0 | 113 | 107 | 112 | 101 |
| 5 | 104 | 103 | 104 | 98 |
| 10 | 101 | 98 | 102 | 93 |
| 15 | 97 | 95 | 97 | 90 |
| 20 | 96 | 91 | 95.5 | 88 |
| 25 | 95 | 87 | 92 | 87 |
| 30 | 93 | 86 | 91 | 84 |
| 50 | 88 | 83 | 87 | 82 |

In contrast the same test was performed with a brush chipper including a flywheel and air vents as described with respect to the preferred embodiment of the invention. The rotor speed was maintained at about 1,900 rpm which resulted in the speed of the cutting blades being maintained at about 6,000 fpm. Brush was adequately chipped and the noise measured at the same distances from the same points as recorded for Table I were significantly lower and are reported in Table II.

TABLE II

| DISTANCE (FEET) | POINT A | POINT B | POINT C | POINT D |
|---|---|---|---|---|
| 0 | 101 | 99.5 | 94 | 94 |
| 5 | 92 | 91.5 | 92 | 87 |
| 10 | 87 | 88 | 87 | 84 |
| 15 | 85 | 85 | 84.5 | 81 |
| 20 | 84 | 83 | 82 | 79 |
| 25 | 82 | 82 | 81 | 77 |
| 30 | 81 | 80 | 81 | 76 |
| 50 | 77 | 76 | 76 | 73 |

It should be noted that the units db(A) are logarithmic and thus the reduction in the loudness of the noise noted by comparing Tables I and II is more significant than it might appear. For example, at a distance of fifty feet from the edge of the feedtable the noise was reduced from 88 db(A) to 77 db(A) or 11 db(A). By converting the noise measurement to SONES, a unit allowing linear comparison and which is defined in ANSI Standard S3.4 and in ISO R532 method A, the noise reduction is from about 58 SONES to about 30 SONES, that is, the noise has been reduced almost in half.

While in the foregoing there has been described a preferred embodiment of the invention, it should be understood that various modifications and changes may be made by those skilled in the art without departing from the true spirit and scope of the invention as recited in the appended claims:

I claim:

1. A brush chipper comprising a housing having an inlet opening and an outlet opening communicating with a discharge chute; a cutter bar rigidly carried in said housing and a rotor rotatably mounted adjacent said cutter bar, said rotor including a plurality of cutting blades extending outwardly beyond the periphery thereof, said cutting blades being operable with said cutter bar for cutting brush fed through said inlet opening into small chips and to discharge said chips through said outlet opening and into said discharge chute, blower means having an air intake opening and a discharge opening communicating with said discharge chute at a point spaced from said rotor for conveying said chips through said discharge chute, inertia means mounted for rotation with said rotor whereby said rotor can be rotated at a slower speed than normal and provide sufficient force so that said cutting blades can adequately cut said brush and at least one air inlet opening formed in said discharge chute adjacent said rotor.

2. A brush chipper in accordance with claim 1 wherein said inertia means is a flywheel mounted on a shaft carrying said rotor.

3. A brush chipper in accordance with claim 1 wherein said air inlet opening is formed in said discharge chute between said point where said discharge opening communicates with said discharge chute and said rotor.

4. A brush chipper in accordance with claim 1 wherein said inertia means allows the speed of said cutting blades to be reduced to within a range of about 58% to about 84% of the normal operating speed of said blades without said inertia means.

5. A brush chipper in accordance with claim 4 wherein said inertia means allows the speed of said cutting blades to be reduced to about 65% of their normal operating speed.

6. A brush chipper in accordance with claim 1 wherein said inertia means allows the speed of said cutting blades to be reduced from a range of about 9,000 fpm to about 9,500 fpm to a range of about 5,500 fpm to about 7,500 fpm.

7. A brush chipper in accordance with claim 6 wherein said inertia means allows the speed of said cutting blades to be reduced to about 6,000 fpm.

8. A brush chipper in combination with a trailer and a power supply, said brush chipper comprising a housing carried on said trailer and including an inlet opening and an outlet opening in communication with a discharge chute; a cutter bar rigidly carried in said housing intermediate said inlet and outlet openings and a rotor carried on a shaft extending through the end walls of said housing, one end of said shaft being driven by said power source for rotating said rotor; cutting blades carried in recesses formed on said rotor, said cutting blades cooperating with said cutter bar when said rotor is being rotated for cutting brush fed through said inlet opening into chips, said recesses including an unoccupied portion for hurling said chips through said outlet opening into said discharge chute; blower means including an impeller mounted on the other end of said shaft and conduit means communicating with said impeller and the interior of said discharge chute at a point spaced from said rotor, rotation of said impeller providing a stream of air through said discharge chute for conveying said chips; a flywheel mounted on said shaft whereby said power supply can drive said rotor such that the speed of said cutting blades can be reduced from a range of about 9,000 fpm to about 9,500 fpm to a range of about 5,500 fpm to about 7,500 fpm and still provide sufficient force to allow adequate cutting of said brush; and air inlet means formed in said discharge chute between said conduit means and said rotor.

9. A brush chipper in accordance with claim 8 wherein the speed of said cutting blades can be reduced to about 6,000 fpm.

10. A brush chipper comprising a housing having an inlet opening and an outlet opening communicating with a discharge chute; a cutter bar rigidly carried in said housing and a rotor rotatably mounted adjacent said cutter bar, said rotor including a plurality of cutting blades extending outwardly beyond the periphery thereof, said cutting blades being operable with said cutter bar for cutting brush fed through said inlet opening into small chips and to discharge said chips through said outlet opening and into said discharge chute, blower means communicating with said discharge chute at a point spaced from said rotor for conveying said chips through said discharge chute, inertia means mounted for rotation with said rotor whereby said rotor can be rotated at a slower speed than normal and provide sufficient force so that said cutting blades can adequately cut said brush and at least one air inlet opening adjacent said rotor, said air inlet opening being formed in said discharge chute between said point where said blower means communicates with said discharge chute and said rotor.

* * * * *